June 28, 1960 W. A. WOOTTEN 2,943,156

MAGNETIC FIELD REPRODUCING APPARATUS

Original Filed June 4, 1954

INVENTOR.
WILLIAM A. WOOTTEN
BY Ernest J. Filley
Attorney

United States Patent Office 2,943,156

Patented June 28, 1960

2,943,156

MAGNETIC FIELD REPRODUCING APPARATUS

William Albert Wootten, 3868 Franklin Ave., Hollywood, Calif.

Continuation of application Ser. No. 434,438, June 4, 1954. This application Sept. 18, 1958, Ser. No. 761,742

2 Claims. (Cl. 179—100.2)

This invention relates to apparatus for reproducing electrical signals from magnetic signals stored in a recording medium. A preferred type of recording medium comprises a cellulose acetate tape coated with a magnetic sensitive metallic oxide. It is to be understood, however, that the principles of invention are applicable to any type of recording medium. The present application is a continuation of my prior application, Serial No. 434,438, filed June 4, 1954, for Magnetic Field Reproducing Apparatus.

In my copending applications, Serial No. 335,731, filed February 9, 1953, for System for Modulating a Magnetic Field for Electrical Reproduction, and Serial No. 397,570, filed December 11, 1953, for System for Recording and Reproducing Signals with Magnetic Tape, there are disclosed methods and apparatus for recording electrical signals on a magnetic tape by modulating a magnetic field. This modulation is accomplished by the magnetic field around a beam of charged particles directed past the magnetic tape, the beam current, and therefore the magnetic field, being modulated in accordance with the signals to be recorded. Necessarily, the resultant signals recorded on the tape are relatively weak and a highly sensitive reproducing apparatus is required. In the aforementioned copending applications, this reproducing apparatus employs a beam of charged particles passed adjacent to a section of the moving tape. The magnetic fields set up by the magnetic signals in the tape together with other magnetic fields serve to deflect the beam, and suitably positioned capacity plates are charge-modulated in accordance with these deflections.

The recording methods and apparatus described in these copending applications make use of a sweeping beam of charged particles in order that high frequency television signals may be recorded, the signals on the tape running generally transversely of the tape in the form of a series of angulated striations corresponding to the sweeps on the cathode ray tube of a television receiving set. By using a sweeping electron beam, very high frequency signals may be recorded.

The present invention has as its primary object the provision of an improved reproducing apparatus for detecting signals placed on a magnetic tape without limitation as to frequency, in accordance with the recording methods and apparatus described in the copending applications.

More particularly, objects of the present invention are to provide a reproducing apparatus which is small, compact, and more sensitive to the magnetic fields set up by the magnetic signals in the tape than apparatus heretofore accomplished whereby increased fidelity results, and which avoids the use of magnetic material other than the recording medium.

These and other objects and advantages of the invention are attained by employing a relatively low velocity stream of charged particles of relatively high charge density. The tape from which the signals are to be reproduced is passed adjacent this stream, and because of the low stream velocity, relatively large deflections of the charged particles by the signals on the tape are attained. These deflections are detected by a pair of laterally disploced anode plates disposed to intercept the stream whereby the deflections result in one plate receiving more charges than the other and vice-versa. Preferably, a pair of field biasing plates are also employed for changing the general drift direction of the stream to permit adjustment of the stream path direction in accordance with the orientation of the signal striations on the tape for maximum detection by the anode plates. Because no magnetic iron or narrow sweep type beam is employed, there are substantially no limitations imposed by high frequencies and short wave lengths.

A better understanding of the invention will be had by referring to the accompanying drawings, in which.

Figure 1:
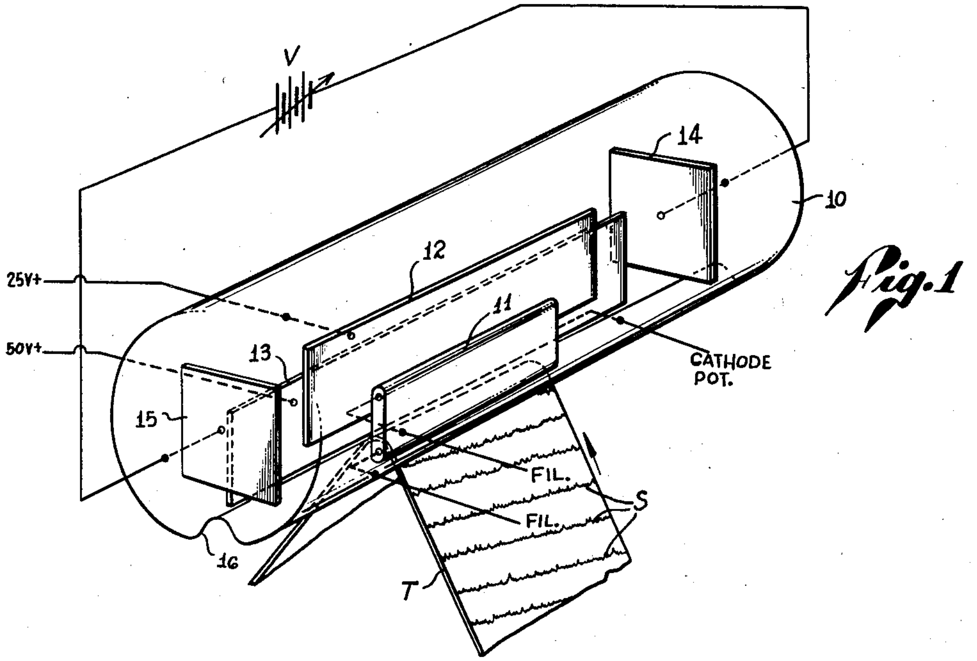
Fig. 1 is a general perspective schematic showing of the reproducing apparatus.

Referring to the drawings and particularly to Fig. 1, there is shown an evacuated enclosure 10 provided with an indirectly heated cathode 11 of relatively large emitting area, and a pair of laterally displaced anode plates 12 and 13. As shown, the plate 13 is of somewhat larger area than the plate 12 and is positioned in back of plate 12 with respect to the cathode. The lateral displacement of the plates results in only a portion of the plate 12 being disposed between the cathode and plate 13 as seen best in Fig. 2. Also disposed in the enclosure 10 are a pair of biasing field generating plates 14 and 15, these being positioned respectively at opposite ends of the anode plates 12 and 13, so as to create an electric field parallel to the surface of the anode plates.

The evacuated enclosure 10 is provided along its lower portion with a longitudinal indent or groove 16. As shown clearly in Fig. 2, this indent or groove is arranged to serve as part of a guide for a magnetic tape T. A suitable non-magnetic cylindrical bead 17 held by a non-magnetic member 18 serves to support and guide the underside of the tape T, whereby the tape is positioned to pass directly under the lower edge of the front face of the center anode plate 12.

Relatively low positive voltages of 25 and 50 volts, for example, are applied to the anode plates 12 and 13 respectively, and an adjustable D.C. voltage is applied to the bias field plates 14 and 15 from an adjustable voltage source V.

Figure 2:
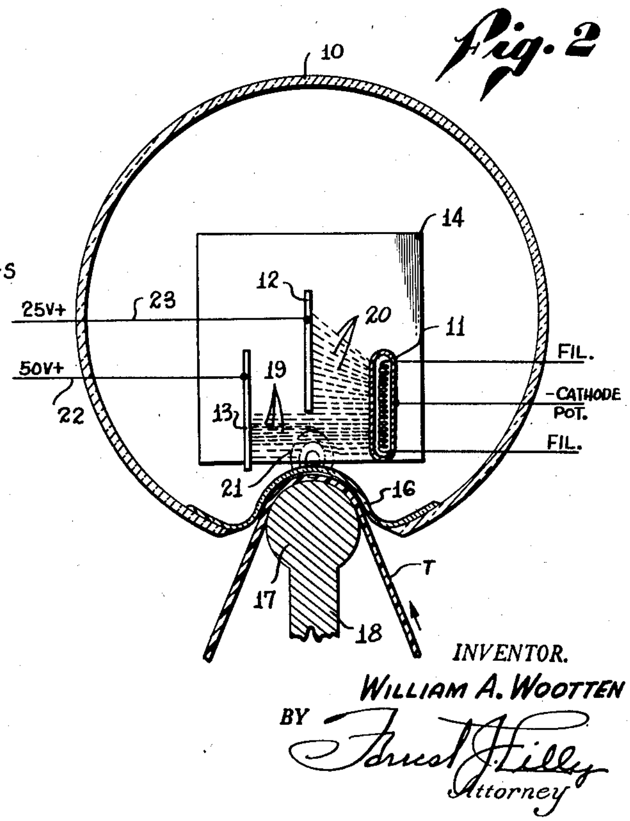
Fig. 2 is an enlarged cross-section of the apparatus shown in Fig. 1.

The operation of the reproducing unit as thus described is as follows:

The magnetic tape T is continuously moved over the guide bead 17 as indicated by the arrow. Filament voltage to the cathode heats the emitting surface thereof, producing a cloud of charged particles. These particles drift towards the larger anode plate 13 in the form of a low velocity stream. A portion of the particles in this stream are intercepted by the center anode plate 12. Referring specifically to Fig. 2, the particles in the lower portion of the stream intercepted by the plate 13 are designated 19, while the particles in the upper portion of the stream intercepted by the anode plate 12 are designated 20.

Figure 3:
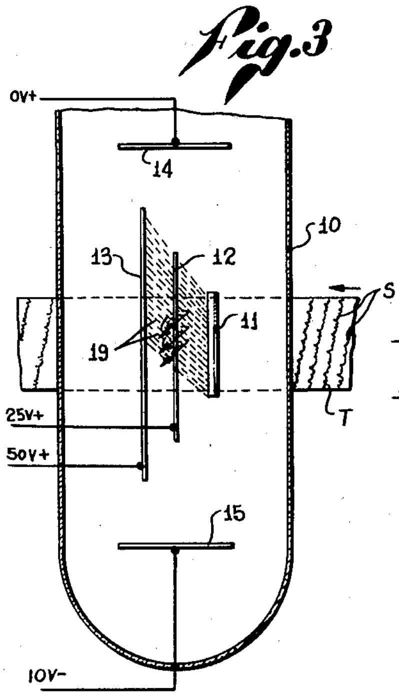
Fig. 3 is a plan view of the apparatus shown in Fig. 1.

The various signals on the tape are represented by the striation lines S in Figs. 1 and 3, and have magnetic fields associated therewith. These magnetic fields indicated at 21 in Fig. 2, will serve to deflect a portion of the charges in the particle stream upwardly towards the lower edge of the center anode plate 12. The stronger the magnetic signal, the more particles are intercepted by the center anode plate, while the weaker the magnetic signal the less particles are intercepted. Thus, the change in the ratio of the charges intercepted by the plates 12 and 13 is a function of the changes in the magnetic fields associated with the signals on the tape.

It is to be noted that the deflection of the particles is the result of the interference of the magnetic field associated with a moving charge, with the magnetic field set up by the signals in the tape. In recording signals on the tape, the axis of greatest magnetic sensitivity of the anisotropic media in the metallic oxide of the tape may be angulated somewhat with respect to the longitudinal axis of the tape. This result would occur, for example, if the recording head or other recording mechanism were angulated slightly with respect to the direction of movement of the tape. To insure maximum deflecting force on the charged particles in the stream of charges, it is important that their direction of travel be such that their associated magnetic fields are in substantially the same plane as the effective portions of the magnetic fields set up by the tape. The direction of travel of the stream is thus made adjustable, within limits, by means of the biasing field generating plates 14 and 15.

Referring to Fig. 3, for example, it will be noted that a positive voltage on plate 14 and a negative voltage on plate 15 will set up an electrical field tending to direct the stream of particles from the cathode 11 towards the plate 14, whereby their path direction is angulated with respect to the moving tape T. Reversing the polarity of the voltage to the plates 14 and 15 will bias the stream path in the other direction. By suitable experimentation, the optimum biasing field for maximum changes in the ratio of the charges intercepted by the anode plates 12 and 13 can be found.

Referring once again to Fig. 2, it will be noted that the construction of the indent or groove 16 permits only a small transverse portion of the tape to influence the particle stream in the enclosure at one time. Further, only the portion of the tape parallel to the general stream path will have maximum influence on the particle stream. This portion is disposed directly under the front face of the anode plate member 12. Therefore, as the tape is moved over the bead 17, and a signal striation S commences to pass within the detent, the stream will first be influenced by the signals on the leading end of the striation, and as the tape progresses in its forward motion, the other portions of the angulated striation will progressively pass adjacent the particle stream. Thus, the modulated ratio of charges intercepted by the anode plates 12 and 13 is a function of the several signals progressively acting on the stream over one striation. The charge modulation on the anode plates represents the video signals and may be amplified and applied to the grid of the reproducing cathode ray tube of a television set, each complete striation corresponding to one sweep of the television receiving tube sweep beam.

It is to be emphasized that the apparatus of the present invention is highly sensitive to weak magnetic fields since the reproduction depends upon the degree of deflection caused by these fields and the degree of deflection is greatly increased in view of the low velocity of the particle stream from cathode to the anode 13. The detecting anode plate 12 is positioned so that the plane of its front face includes the apex of the groove 16 whereby this face is in the plane of maximum deflection. Further, the large emitting surface of the cathode insures a high charged particle density whereby a relatively high charged particle beam current is realized notwithstanding the low velocity of the particles in the beam. Since the signals on the tape are directly detected by the moving stream of charged particles, and since no magnetic fields or coils for generating such fields are employed, there is no limitation as to the frequency of the signals that may be detected.

I claim:

1. In an apparatus for reproducing magnetic signals from a recording medium, the combination comprising: an evacuated enclosure; a cathode in said enclosure; an anode spaced a given distance from said cathode; an indent in said enclosure forming an inwardly directed groove in a plane between said cathode and anode; means for guiding and moving said recording medium within said groove whereby the magnetic field from said signals is proximate to the normal flow of charged particles between said cathode and anode; a conducting plate member positioned between said cathode and anode to intercept at least a portion of said charged particles whereby magnetic signals from said recording medium deflects said normal flow of charged particles to vary the number of charged particles intercepted by said plate member; and end biasing plates for passing an electric field between said cathode and anode in a direction transverse to the direction of motion of said charged particles and parallel to the plane of said anode to cause said particles to cross said indent groove and recording medium at an angle with respect to the direction of motion of the recording medium.

2. An apparatus according to claim 1 in which the apex of said inwardly directed groove lies in the plane of the front face of said plate member.

References Cited in the file of this patent

UNITED STATES PATENTS

| | | |
|---|---|---|
| 2,165,307 | Skellett | July 11, 1939 |
| 2,283,148 | Bruce | May 12, 1942 |